(12) United States Patent
Samuel et al.

(10) Patent No.: US 11,663,344 B2
(45) Date of Patent: May 30, 2023

(54) SYSTEM AND METHOD FOR BINDING APPLICATIONS TO A ROOT OF TRUST

(71) Applicant: Dell Products L.P., Round Rock, TX (US)

(72) Inventors: Balasingh P. Samuel, Round Rock, TX (US); Richard Martin Tonry, Austin, TX (US); Adolfo S. Montero, Pflugerville, TX (US); Jacob Vincent Mink, Austin, TX (US)

(73) Assignee: Dell Products L.P., Round Rock, TX (US)

(*) Notice: Subject to any disclaimer, the term of this patent is extended or adjusted under 35 U.S.C. 154(b) by 204 days.

(21) Appl. No.: 17/332,184

(22) Filed: May 27, 2021

(65) Prior Publication Data

US 2022/0382887 A1  Dec. 1, 2022

(51) Int. Cl.
*G06F 21/60* (2013.01)
*G06F 21/57* (2013.01)
*G06F 21/44* (2013.01)

(52) U.S. Cl.
CPC ............ *G06F 21/604* (2013.01); *G06F 21/44* (2013.01); *G06F 21/572* (2013.01)

(58) Field of Classification Search
CPC ..... G06F 21/44–445; G06F 21/57–575; G06F 21/60; G06F 21/604; G06F 21/62–6218; G06F 21/64–645; H04L 63/0823
See application file for complete search history.

(56) References Cited

U.S. PATENT DOCUMENTS

2017/0063975 A1* 3/2017 Prakash .............. H04L 67/1001
2021/0266184 A1* 8/2021 Robison ................ H04L 9/3268

FOREIGN PATENT DOCUMENTS

WO    WO-2019084577 A1 * 5/2019 ............. G06F 21/12

* cited by examiner

Primary Examiner — Kevin Bechtel
(74) Attorney, Agent, or Firm — McDermott Will & Emery LLP (57) ABSTRACT

A method for binding applications to a platform root of trust includes pre-provisioning application binding components in an information handling system. An application requesting OS access sends its access control list (ACL) and application metadata to the BIOS, which performs initial checks. The BIOS responds with platform metadata and a first nonce. The application communicates the metadata, the first nonce and a second nonce to a server. The server checks the nonces and metadata, creates a third nonce and an application binding object (ABO). The application checks the nonces and sends a binding certificate to the BIOS. The BIOS checks the nonces, creates a binding certificate, verifies the binding certificate and sends a binding session credential (BSC) to the application. The application binds the BSC with platform credentials.

14 Claims, 5 Drawing Sheets

| APPID, VERSION, PLATFORM, METADATA | APPLICATION REFERENCE MEASUREMENT | ACL | APPLICATION LEASE/ RENEWAL TRIGGER(S) | PUBLIC KEY |
|---|---|---|---|---|
| APPID_1+ Manifest_1.0.5+ Metadata | HASH_APPID_1 | <LIST OF RESOURCES AND ACCESS RIGHTS FOR APPID_1> | CHASSIS INTRUSION DETECTED | KEY_1 |
| APPID_2+ MANIFEST_3.1.3+ Metadata | HASH_APPID_2 | <LIST OF RESOURCES AND ACCESS RIGHTS FOR APPID_2> | BIOS UPDATED | KEY_2 |
| APPID_3+ Manifest_1.0.7+ Metadata | HASH_APPID_3 | <LIST OF RESOURCES AND ACCESS RIGHTS FOR APPID_1> | 60 DAYS OR APPLICATION UPDATED OR BIOS UPDATED OR SOS BOOT DETECTED | KEY_3 |

SYSTEM AND METHOD FOR BINDING APPLICATIONS TO A ROOT OF TRUST

BACKGROUND

Field of the Disclosure

This disclosure relates generally to information handling systems and, more particularly, to systems for providing a trusted entity to authenticate commands to a platform.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever-evolving and emerging threats include attacks on the BIOS configuration and hardware and software settings.

SUMMARY

Embodiments disclosed herein may be generally directed to information handling systems and systems and providing a method to perform an initial trusted binding with an off-host signing service to establish a trust relationship between an application and its platform BIOS. The binding can be initiated during manufacture or during platform installation in a customer environment.

Embodiments may reduce the threat landscape associated with high privilege applications accessing BIOS resources and protect data transport channels between above-OS and below-OS agents.

In one aspect, a method for binding an application to a platform may comprise storing, in an information handling system memory medium, a plurality of application binding components received from an application binding server, the application binding components including a public key, an application identifier, an application version, an application reference measurement, a reference certificate and an access control list (ACL) comprising a list of resources and access rights for each resource associated with the application identifier, and one or more application lease renewal triggers. The application binding components may be pre-provisioned, such as during a manufacturing process.

When an application installed on the information handling system, the application sends a request for access to one or more resources associated with the BIOS, the request includes the ACL. The BIOS verifies one or more application parameters and the ACL and responds to the request by sending platform metadata and a platform binding nonce to the application. After receiving the response from the BIOS, the application sends a request to the application binding server to verify the application. The request includes application metadata, the platform metadata, the platform binding nonce, and an application nonce.

The application binding server receives the request, verifies the application metadata, the platform metadata, the platform binding nonce, and the application nonce, creates an application binding object (ABO) and a server nonce, and sends the ABO to the application. In some embodiments, the application binding server signs the ABO with a private key, wherein the BIOS verifies the ABO with the stored application binding public key.

The application receives the communication from the application binding server and verifies the platform binding nonce, the application nonce and the server nonce. The application sends a binding certificate based on the ABO to the BIOS, which verifies the platform binding nonce, creates a binding certificate from the plurality of application binding components, verifies the binding certificate against the reference certificate and communicates a binding session credential (BSC) to the application.

After the application is bound to the BIOS, communication between the application and the BIOS comprises the application sending a requested operation with the application reference measurement and the BSC to the BIOS, the BIOS verifying the application reference measurement and the BSC, the BIOS verifying the requested operation against the ACL, and the BIOS communicating a result of the requested operation.

In some embodiments, verifying one or more application parameters comprises verifying a unique application identifier matches an application identifier in the pre-provisioned application binding components and a version of the application matches a version of the application in the pre-provisioned application binding components. Verifying an application reference measurement may comprise verifying a hash calculated for the application matches a hash for the application in the pre-provisioned data. Verifying the list of BIOS resources may comprises verifying a resource and an access right corresponding to the BIOS resource.

In some embodiments, an application may be unbound from the BIOS based on one or more application lease/renewal triggers.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, application "24" may refer to an instance of an application, which may be referred to collectively as applications "24" and any one of which may be referred to generically as application "24."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Typically, operating system (OS) software applications require OS administrator access to communicate with the BIOS and/or modify platform hardware and/or the BIOS configuration.

Common protections to control access to a configuration space and hardware and/or software settings include requiring a BIOS administrator password and the password serves as the primary access authorization mechanism.

In response to changes in security landscape and ever-evolving and emerging threats, BIOS passwords are being replaced with more secure public key infrastructure (PKI) enabled manageability interfaces. A PKI interface allows for a trusted entity, the signing service, to authenticate commands to a platform. An issue with a PKI-based solution is that it does not scale well to a software applications performing real-time operations. For example, a PKI implementation requires a connection to the signing service, which is typically accomplished over a secure Internet connection. The overhead of requiring communication with the signing service for each operation is time-consuming and affects system performance and depends on access to an Internet connection.

Embodiments disclosed herein provide a method to perform an initial trusted binding with an off-host signing service to establish a trust relationship between the application and a platform BIOS. The binding can be initiated during manufacturing of the information handling system or can be accomplished during platform installation in a customer environment. Embodiments may include an application binding process, wherein the application may be stored on a platform firmware storage device and may be secured using a binding with a platform root of trust such as a platform Embedded Controller (EC).

Embodiments disclosed herein are described with respect to operating system (OS) applications requiring BIOS resources or information. Particular embodiments are best understood by reference to FIGS. 1-5, wherein like numbers are used to indicate like and corresponding parts.

Figure 1:
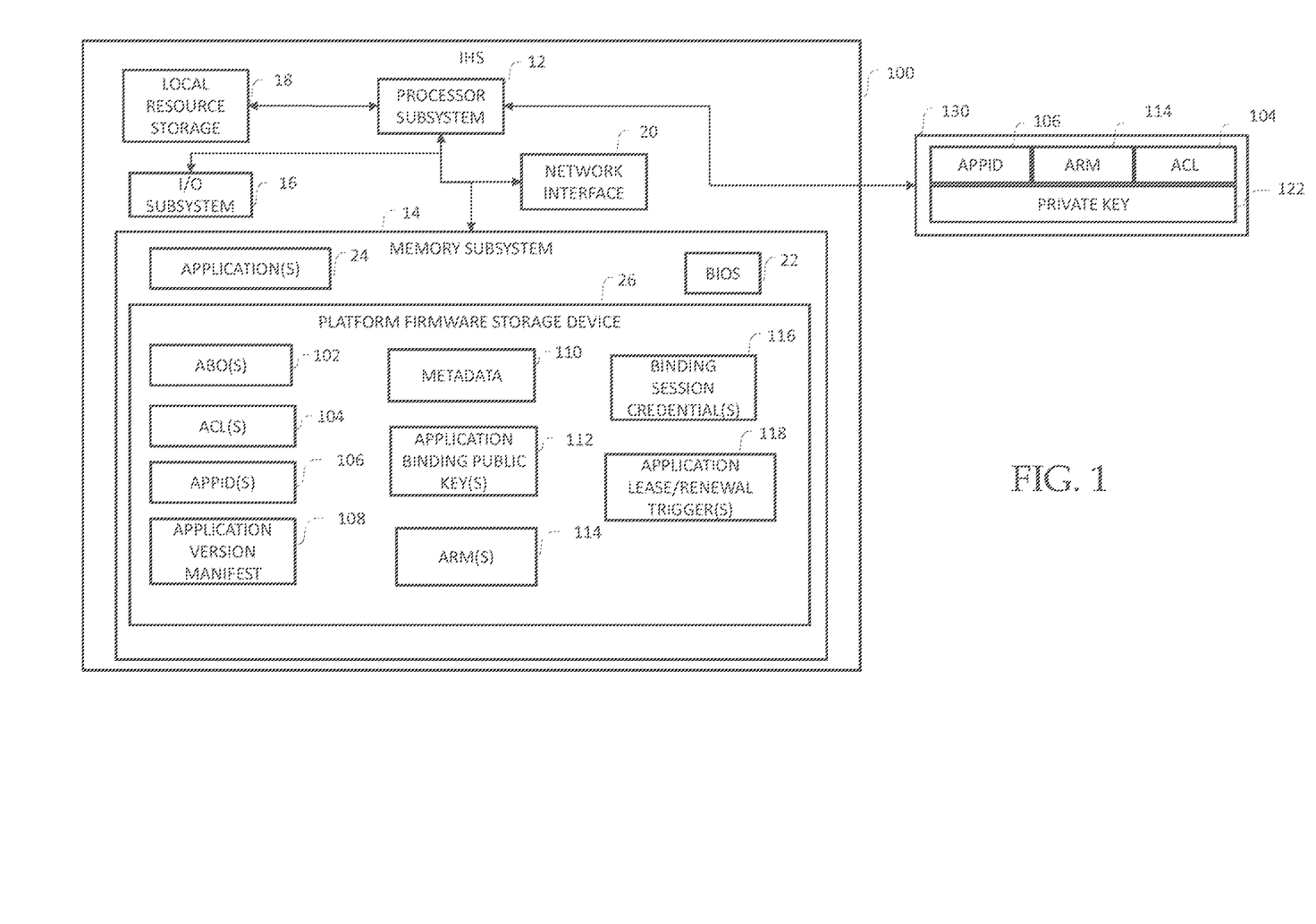
FIG. 1 is a block diagram of selected elements of an embodiment of an information handling system.

Turning to the drawings, FIG. 1 illustrates a block diagram depicting selected elements of an embodiment of information handling system 100 communicatively coupled to an application binding server 130. It is noted that FIG. 1 is not drawn to scale but is a schematic illustration.

As shown in FIG. 1, components of information handling system 100 may include, but are not limited to, a processor subsystem 12, which may comprise one or more processors, communicatively coupled to various system components including, for example, memory subsystem 14, I/O subsystem 16, local storage resource 18 and network interface 20.

Processor subsystem 12 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 12 may interpret and execute program instructions and process data stored locally (e.g., in memory subsystem 14). In the same or alternative embodiments, processor subsystem 12 may interpret and execute program instructions and process data stored remotely (e.g., in a network storage resource).

Communicative coupling may refer to communications using any of a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 14 may comprise a system, device, or apparatus operable to retain and retrieve program instructions and data for a period of time (e.g., computer-readable media). Memory subsystem 14 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

Memory subsystem 14 stores basic input/output system (BIOS) 22 used by processor subsystem 12 to execute certain processes when information handling system 100 is powered up, discussed in greater detail below. Memory subsystem 14 stores applications 24 that may require OS administrator access to communicate with BIOS 22. Memory subsystem 14 may also store application binding components including application binding object 102, Access Control List (ACL) 104, application identifier (AP-PID) 106, version manifest 108, metadata 110, application binding public key 112 and application reference measurement 114. The application binding components for an application 24 may be stored in a platform firmware storage device 26 or other permanent storage medium in memory subsystem 14.

In information handling system 100, I/O subsystem 16 may comprise a system, device, or apparatus generally operable to receive and transmit data to or from or within information handling system 100. I/O subsystem 16 may represent, for example, a variety of communication interfaces, graphics interfaces, video interfaces, user input interfaces, and peripheral interfaces. In various embodiments, I/O subsystem 16 may be used to support various peripheral devices, such as a touch panel, a display adapter, a keyboard, a touch pad, or a camera, among other examples. In some implementations, I/O subsystem 16 may support so-called 'plug and play' connectivity to external devices, in which the external devices may be added or removed while information handling system 100 is operating.

Local storage resource 18 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 20 may be a suitable system, apparatus, or device operable to serve as an interface between information handling system 100 and a network (not shown). Network interface 20 may enable information handling system 100 to communicate over a network using a suitable transmission protocol or standard. In some embodiments, network interface 20 may be communicatively coupled via a network to a network storage resource (not shown). A network coupled to network interface 20 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 20 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 20 or various components associated therewith may be implemented using hardware, software, or any combination thereof.

To bind applications 24, memory subsystem 14 may include platform firmware storage device 26 configured for storing one or more application binding objects (ABOs) 102, application identifiers (APPIDs) 106, access control lists (ACLs) 104, application binding public keys 112, application reference measurements 114, binding session credentials 116, and application lease/renewal triggers 118 for all applications 24 authorized to access BIOS resources.

FIG. 1 further depicts application binding server 130 configured to generate, for each application 24, an application identifier (APPID) 106 as unique application identifier, an application reference measurement (ARM) 114 and an access control list (ACL) 104. Application binding server 130 may use private key 122 as part of an application binding process, discussed in greater detail below.

Application reference measurement (ARM) 114 may be used to verify the integrity and authenticity of application 24. In some embodiments, an ARM 114 may refer to a hash of application 24. A hash calculated for application 24 may be compared against an ARM 114 received from application binding server 130 to verify the integrity and authenticity of application 24.

Access control list (ACL) 104 may refer to a list of allowed BIOS/EC resources for a specific application 24 on a specific device, device class or user class. ACLs 104 may be grouped for organizational level in an enterprise environment. For example, within a company's IT infrastructure, a first ACL 104 may correspond to an engineering organization and a second ACL 104 may correspond to a marketing organization.

Application lease renewal event triggers 118 refer to events that cause application 24 to unbind from BIOS 22. Examples of application lease renewal event triggers 118 include a policy from an IT administrator, expiration of a lease period, an application usage count, an update to BIOS 22 and an endpoint security incident. An endpoint security incident may be, for example, a software incident such as virus detection, or a hardware incident such as an enclosure breach. Thus, if BIOS 22 needs to update, application 24 previously authorized to access BIOS resources may be unbound and denied access to those resources until information handling system 100 updates BIOS 22 and then application 24 will need to rebind.

Information handling system 100 may also store application binding objects (ABOs) 102, application version manifest 108 comprising a list of applications 24, including versions and other metadata, described in more detail below.

Pre-Provisioning an Application Access Control List to Bios

Figure 2:
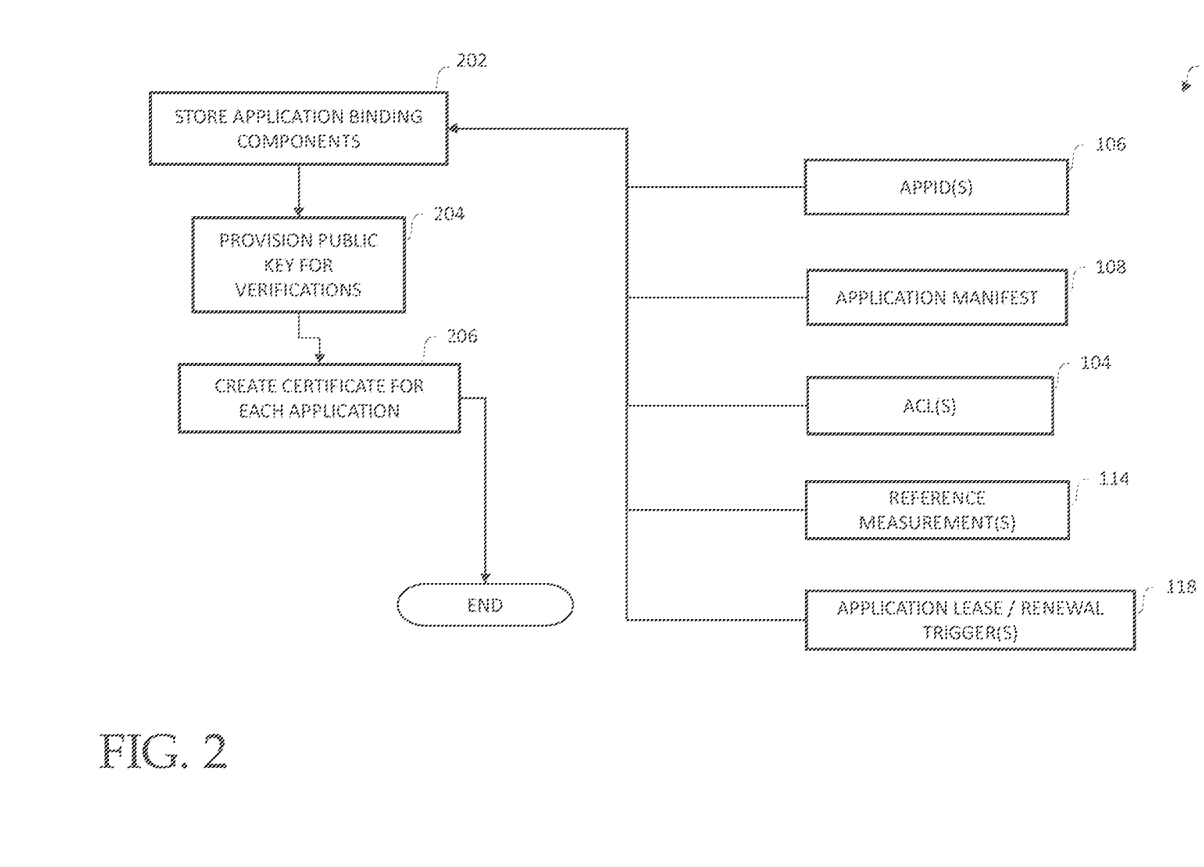
FIG. 2 is a flowgraph of steps in a process for pre-provisioning application binding components in an information handling system.
Figure 3:
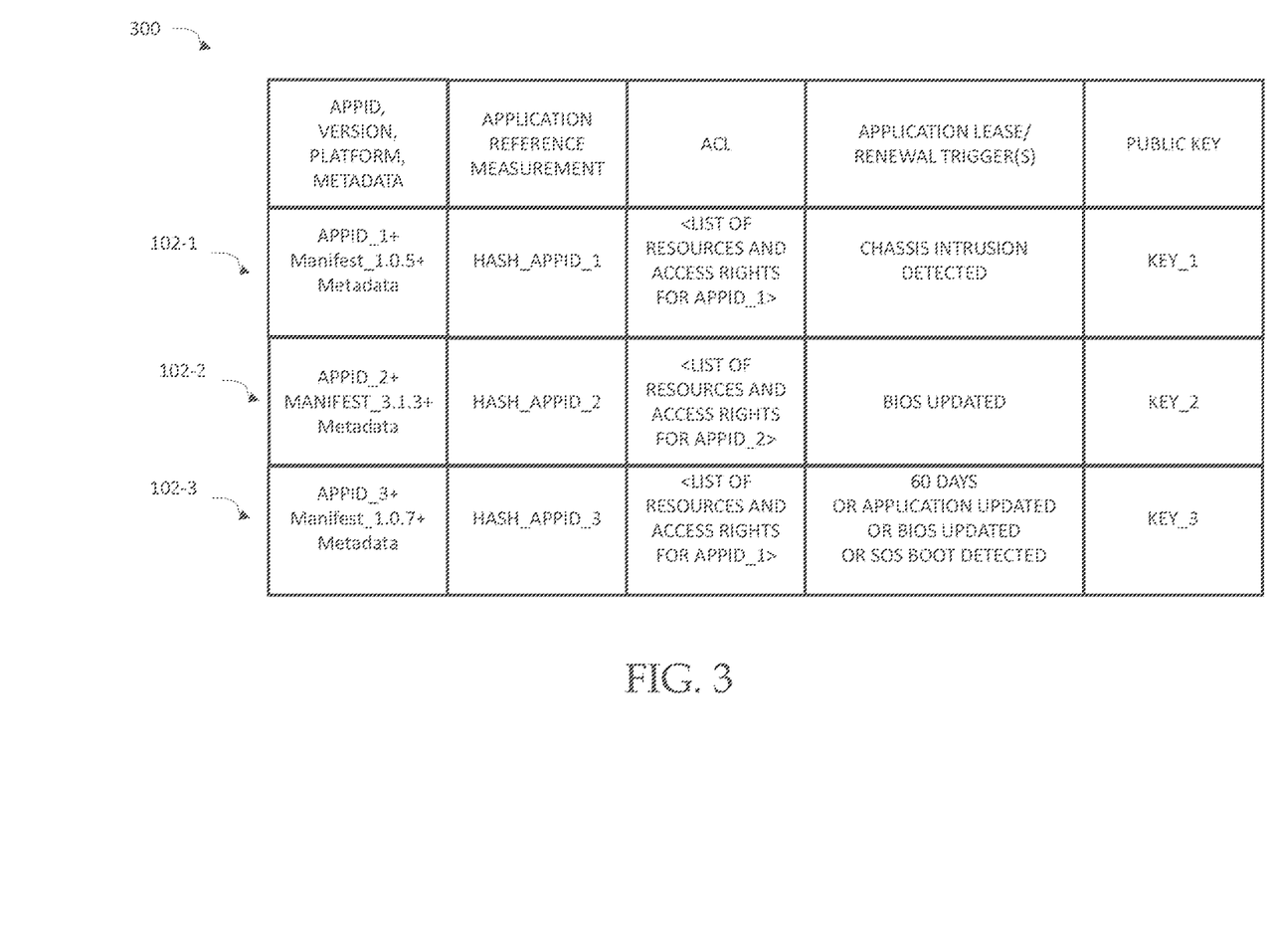
FIG. 3 depicts a data structure for storing application binding components of an application binding object.

Some application binding components are pre-provisioned on information handling system 100 to support an application binding process. Referring to FIGS. 1 and 2, memory subsystem 14 in information handling system 100 may be pre-provisioned with application binding components.

At step 202, application binding server 130 may communicate with information handling system 100 to store application binding components such as APPIDs 106, application version manifest 108, ACLs 104, ARMs 114 and application lease renewal triggers 118. Application manifest 108 may include information about application 24 and include metadata 110 about the application 24. Metadata 110 may refer to application-specific metadata as described above and further include platform-specific data, including platform unique identification data. Platform metadata may include a manufacturer identifier and which version of BIOS 22 is on information handling system 100.

At step 204, application binding server 130 may communicate application binding public key 112 to information handling system 100 for verifying ABOs 102 sent from application binding server 130. For example, application binding public key 112 may be used to verify an ABO 102 that was signed using private key 122.

At step 206, application binding server 130 may create a reference certificate for each application 24. A reference certificate comprises information stored in an ABO 102 for a specific application 24.

Binding session credential (BSC) 116 refers to a public key stored on information handling system 100 and may be used to verify the access authority for applications 24.

Application Binding Objects

Application binding objects 102 may be created to contain all the information needed to create a reference certificate for binding applications 24 to a root of trust for information handling system 100.

FIG. 2 depicts a table of application binding components for three ABOs 102. Each row may correspond to an ABO 102 created for an application 24 and each column contains application binding components for the ABO 102 to bind a specific application 24. For example, a first row may be associated with a first ABO 102-1 and contain application binding components necessary to bind a specific application 24 with BIOS 22, wherein the application binding components include an application identifier (e.g., APPID_1) 106 as a unique identifier, an application manifest version (e.g., Manifest 1.0.5) 108, application metadata 110, an application reference measurement (ARM) 114 such as a hash (e.g., HASH_APPID_1), ACL 104 containing a list of resources and access rights, a list of application lease renewal triggers 118 and application binding public key 112 used to verify ABO 102-1 (e.g., Key_1).

Each ABO 102 may be signed by application binding server 130 using private key 122. An ABO 102 may be created and stored in information handling system 100 when a new application 24 is released and application binding components can be added to an ABO 102 or deleted from an ABO using a secure payload delivery mechanism. When application 24 requests access to BIOS resources, ABO 102 may be compared against a reference certificate previously generated by application binding server 130 and stored in information handling system 100.

Adding an ABO to an Application Binding Server

In some embodiments, when an application 24 is updated in the field, ABO 102 corresponding to the updated application 24 may be updated with new information using a secure payload delivery mechanism. Based on the ABO 102, a reference certificate may be created using private key 122. An updated reference certificate may be added to a database in application binding server 130. Application binding server 130 may manage reference certificates based on business priorities, service contract and cost.

Application Binding

Figure 4:
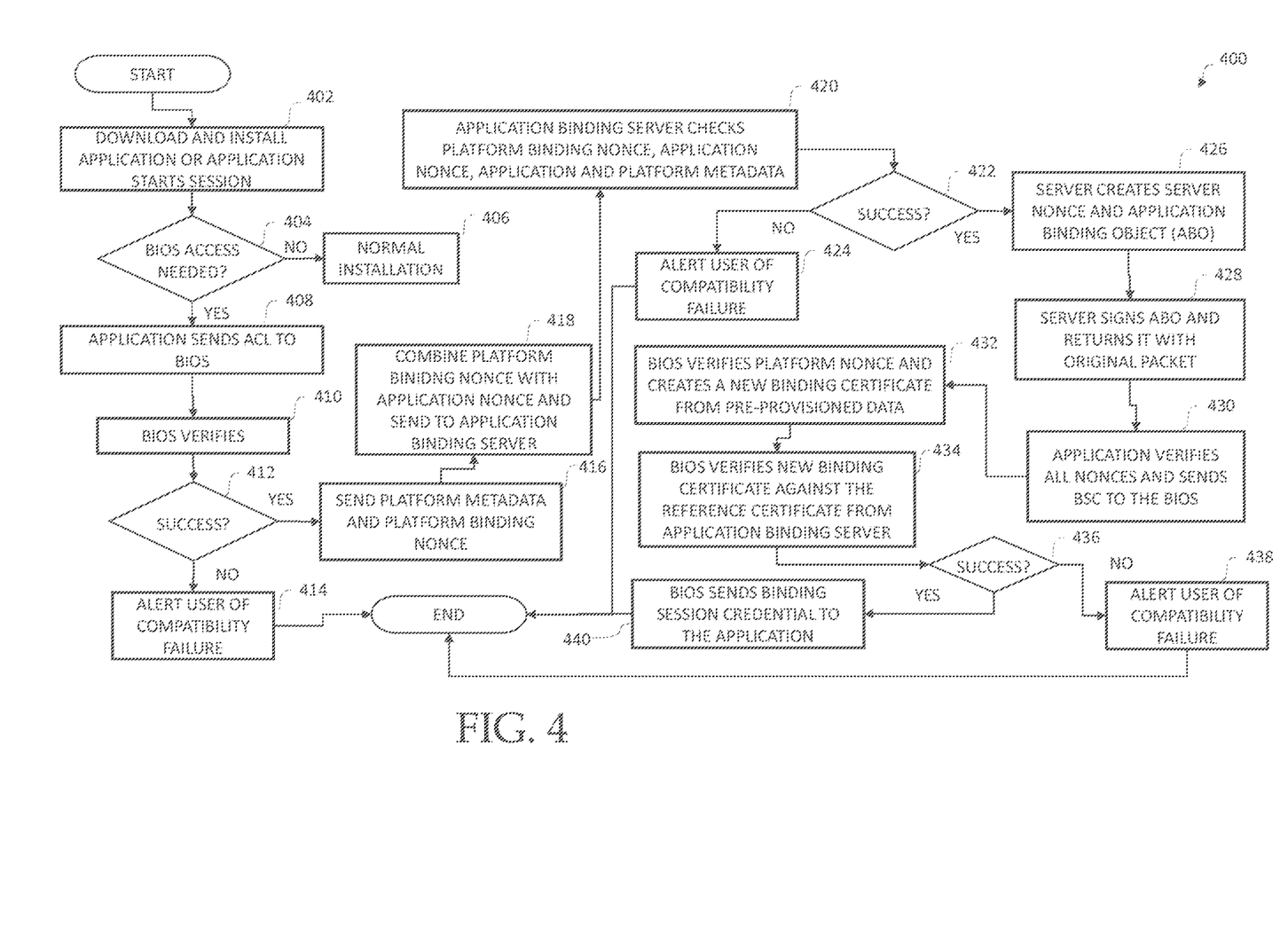
FIG. 4 is a flowgraph depicting a method for binding an application to a platform.

Referring to FIG. 4, a method 400 for application binding may begin at step 402 when an application 24 is downloaded or application 24 starts a session.

At step 404, embodiments determine if application 24 requires BIOS access. For example, application 24 may be a legacy application that does not require any BIOS resources.

At step 406, if application 24 does not require BIOS access, normal installation of application 24 may proceed.

At step 408, if application 24 requires BIOS access, then application 24 publishes or sends its access control list (ACL) 104 to BIOS 22.

At step 410, BIOS 22 makes preliminary checks to determine the validity and safety of ACL 104 corresponding to application 24. In some embodiments, BIOS 22 may verify information about application 24 such as APPID 106 and version metadata 110 against information stored in memory subsystem 14, may verify a calculated ARM 114 matches ARM 114 stored in memory subsystem 14, and may verify a list of resources and access rights in ACL 104 against ACL 104 stored in memory subsystem 14.

If one or more preliminary checks fail, information handling system 100 may, at step 414, alert a user that the application version and BIOS 22 are incompatible such that application 24 and/or BIOS 24 must be updated, and process 400 may end. Steps 402-410 may stop access to the BIOS/EC resources for any application not approved.

If BIOS 22 determines application 24 meets the initial validity checks, then at step 416, BIOS 22 sends platform metadata 110 to application 24 along with a platform binding nonce.

At step 418, application 24 combines the platform metadata 110 and the platform binding nonce with an application nonce and sends the information as a request to application binding server 130.

At step 420, application binding server 130 receives the request and checks application 24, the BIOS/platform metadata 110, the application nonce and the platform binding nonce.

At step 422, application binding server 130 determines if the verification was a success.

If the verification is not successful, then at step 424, application 24 alerts a user of a compatibility failure and application binding process 400 ends.

If the verification is successful, then at step 426, application binding server 130 creates a server nonce and creates application binding object (ABO) 102.

At step 428, application binding server 130 signs ABO 102 with private key 122 and returns the signed ABO 102 with the request to application 24.

At step 430, application 24 verifies the platform binding nonce, the application nonce and the server nonce using application binding public key 112 and sends a binding session credential (BSC) 116 to BIOS 22.

At step 432, BIOS 22 verifies the platform binding nonce and creates a binding certificate from pre-provisioned data.

At step 434, BIOS 22 verifies the new binding certificate against a reference certificate received from application binding server 130.

If, at step 436, BIOS 22 determines the verification was not successful, then at step 438, BIOS 22 denies the application binding request and sends a failure response to the application.

If, at step 436, BIOS 22 determines the verification was successful then, at step 440, BIOS 22 stores an application binding status and sends a response including a binding session credential (BSC) 116 to the application.

Application 24 may use BSC 116 to anchor to BIOS 22.

Application-Bios Communication after Successful Binding

Figure 5:
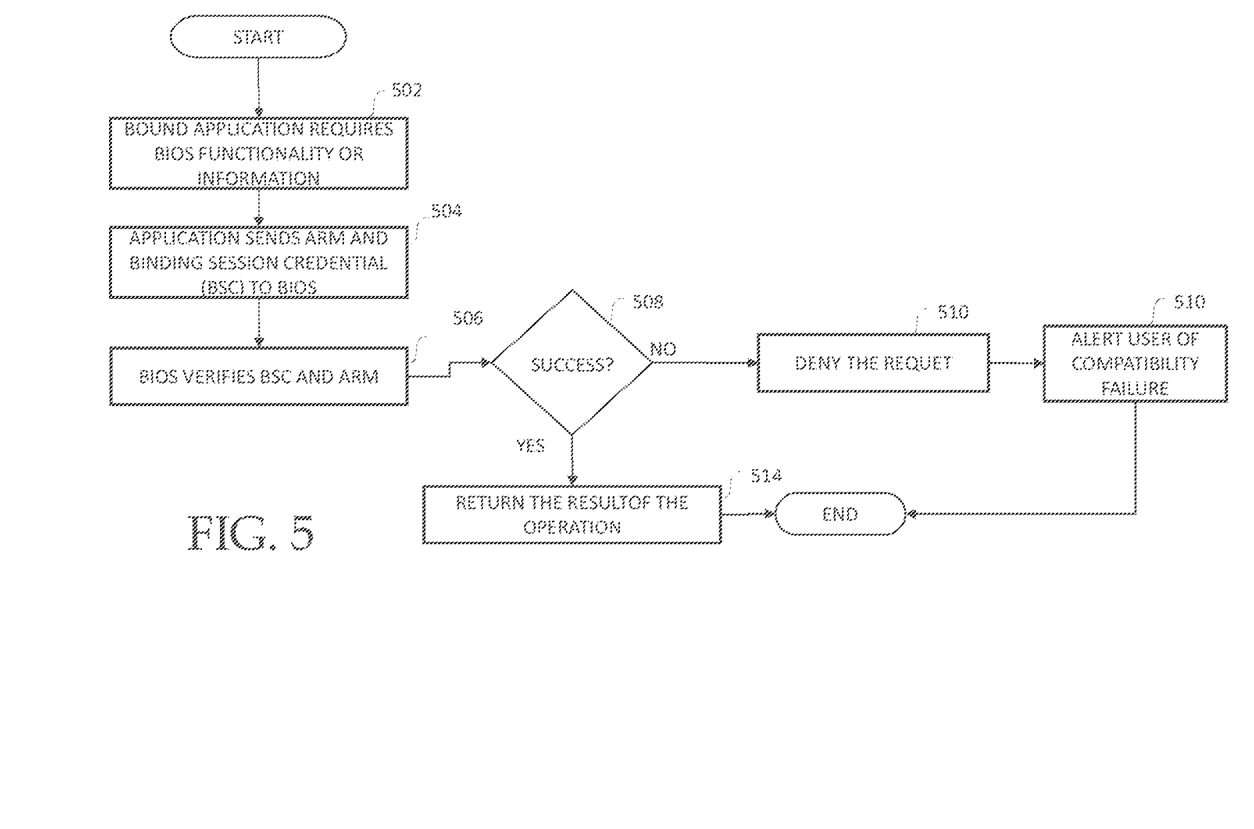
FIG. 5 is a flowgraph depicting how an information handling system may manage communications between an application and BIOS resources.

Referring to FIG. 5, after successful binding, application 24 may access BIOS resources without the overhead of needing a secure Internet connection and requiring communication with a signing service.

At step 502, application 24 may determine it needs BIOS functionality or information.

At step 504, application 24 sends an application reference measurement 114 for application and BSC 116 to BIOS 22.

At step 506, BIOS 22 verifies the BSC 116 and ARM 114.

If, at step 508, BIOS 22 determines the verification was not successful, BIOS 22 denies the request at step 510, alerts a user of compatibility failure at step 512 before ending the session. In some embodiments, if the verification was not successful, application 24 is unbound from BIOS 22.

If, at step 508, BIOS 22 determines the verification was successful, BIOS 22 returns the result of the request to application 24 at step 514.

Renewal of ACL Lease

On an application lease renewal trigger event, application 24 may be unbound and a process starts to renew an application ACL to rebind. Examples of an application lease renewal trigger event include a policy from an IT administrator, expiration of a lease period, an application usage count, a BIOS update, and an endpoint security incident. An endpoint security incident may be, for example, virus detection, enclosure breach, etc. The steps to renew an ACL lease may include steps described above for application binding.

An ACL may be pre-provisioned in information handling system 100 such that an application 24 can only be authorized to use pre-approved BIOS/EC resources.

Methods to enforce application version compatibility with the BIOS version avoid security vulnerabilities such as automatically invalidating application binding when a BIOS is updated and preventing binding and application use if the BIOS is downgraded after binding. Embodiments may prevent binding if the BIOS does not support the application. Embodiments include security-based version protections that prevent use of an outdated or vulnerable BIOS and/or application based on ACL policy. If an unsecure version attempts to bind to the platform process, the binding process will prevent use of the rollback protected combination of BIOS and application.

Embodiments may also provide indicator of attack (IoA) detection response, such as chassis intrusion detection. For example, an application binding of one or more applications may be revoked in response to an indicator of attack. An IoA may also be logged in the BIOS.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for binding an application to a platform of an information handling system with a basic input/output system (BIOS), the method comprising:
   storing, in an information handling system memory medium, a plurality of application binding components received from an application binding server, the application binding components including an application binding public key, an application identifier, an application version, an application reference measurement, a reference certificate and an access control list (ACL) comprising a list of BIOS resources and access rights for each BIOS resource associated with the application identifier, and one or more application lease renewal triggers;
   receiving, from an application installed on the information handling system, a request for access to the BIOS, the request including the ACL;
   verifying one or more application parameters and the ACL;
   sending platform metadata to the application, the platform metadata including a platform binding nonce;
   sending, by the application to the application binding server, a request for verification including the application metadata, the platform metadata, the platform binding nonce, and an application nonce;
   receiving, by the application binding server, the request for verification from the application;
   verifying, by the application binding server, the application metadata, the platform metadata, the platform binding nonce, and the application nonce;
   creating an application binding object (ABO) and a server nonce; and
   sending the ABO to the application;
   verifying, by the application, the platform binding nonce, the application nonce and the server nonce;
   sending a binding certificate based on the ABO to the BIOS;
   verifying, by the BIOS, the platform binding nonce;
   creating, by the BIOS, a binding certificate from the plurality of application binding components;
   verifying the binding certificate created by the BIOS against the binding certificate received from the application binding server; and
   communicating a binding session credential (BSC) to the application.

2. The method of claim 1, wherein communicating between the application and the BIOS further comprises:
   the application sending a requested operation with the application reference measurement and the BSC to the BIOS;
   the BIOS verifying the application reference measurement and the BSC;
   the BIOS verifying the requested operation against the ACL; and
   the BIOS communicating a result of the requested operation.

3. The method of claim 1, wherein verifying one or more application parameters comprises verifying a unique application identifier matches an application identifier in the set of application binding components and a version of the application matches a version of the application in the set of application binding components.

4. The method of claim 1, wherein verifying the application measurement comprises verifying a hash calculated for the application matches a hash for the application in the set of application binding components.

5. The method of claim 1, wherein verifying the list of BIOS resources comprises verifying a BIOS resource in the list of BIOS resources and an access right corresponding to the BIOS resource.

6. The method of claim 1, further comprising unbinding the application based on one or more application lease/renewal triggers.

7. The method of claim 1, further comprising the application binding server signing the ABO with a private key, wherein the BIOS performs verifying the ABO with the stored application binding public key.

8. A system for controlling access to basic input/output system (BIOS) resources of an information handling system, the system comprising:
   an application binding server configured to generate an application identifier, an application reference measurement and an access control list (ACL) comprising a list of BIOS resources and access rights for each BIOS resource associated with the application identifier for an application stored on the information handling system;
   the information handling system comprising further comprising an operating system (OS) and a memory medium storing a plurality of application binding components for the application, the plurality of application binding components including the application identifier, the application reference measurement, the access control list (ACL), an application binding public key, an application version, and at least one application lease/renewal trigger;
   wherein the information handling system is configured to:
     initiate the application;

determine the application specifies one or more BIOS resources in the list of BIOS resources requiring BIOS access; and send the ACL to the BIOS;

wherein the BIOS is configured to:
   verify the application identifier and the application version; and
   send platform metadata and a platform binding nonce to the application;

wherein the application is configured to:
   send the platform binding nonce, the platform metadata, the application metadata and an application nonce to the application binding server; and wherein the application binding server is configured to:
   verify the platform binding nonce, the application nonce, the platform metadata and the application version;
   generate a server nonce;
   create an application binding object (ABO); and
   send the ABO to the application;

wherein the application is configured to:
   verify the platform binding nonce, the application nonce and the server nonce;
   create a binding certificate based on the ABO; and
   communicate the binding certificate based on the ABO to the BIOS;

wherein the BIOS is configured to:
   verify the platform binding nonce;
   generate a binding certificate from the set of application binding components;
   verify the binding certificate generated from the set of application binding components against the binding certificate from the application binding server; and communicate a binding session credential (BSC) to the application.

9. The system of claim 8, wherein:
the application is configured to send a requested operation with the application reference measurement and the BSC to the BIOS; and
the BIOS is configured to:
   verify the application reference measurement and the BSC;
   verify the requested operation against the ACL; and
   communicate a result of the requested operation.

10. The system of claim 8, wherein verifying one or more application parameters comprises verifying a unique application identifier matches an application identifier and a version of the application matches a version of the application in the set of application binding credentials.

11. The system of claim 8, wherein verifying the application measurement comprises verifying a hash calculated for the application matches a hash for the application in the set of application binding components.

12. The system of claim 8, wherein verifying the list of BIOS resources comprises verifying a BIOS resource in the list of BIOS resources and an access right corresponding to the BIOS resource.

13. The system of claim 8, wherein the BIOS is configured to unbind the application based on the one or more application lease/renewal triggers.

14. The system of claim 8, wherein
the application binding server is configured to sign the ABO with a private key; and
the BIOS is configured to verify the ABO with the application binding public key.

* * * * *